(12) United States Patent
Kanevsky et al.

(10) Patent No.: US 9,293,133 B2
(45) Date of Patent: *Mar. 22, 2016

(54) IMPROVING VOICE COMMUNICATION OVER A NETWORK

(71) Applicant: International Business Machines Corporation, Armonk, NY (US)

(72) Inventors: Dimitri Kanevsky, Ossining, NY (US); Pamela A. Nesbitt, Ridgefield, CT (US); Tara N. Sainath, New York, NY (US); Elizabeth V. Woodward, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 177 days.

This patent is subject to a terminal disclaimer.

(21) Appl. No.: 13/964,826

(22) Filed: Aug. 12, 2013

(65) Prior Publication Data

US 2014/0214426 A1 Jul. 31, 2014

Related U.S. Application Data

(63) Continuation of application No. 13/752,503, filed on Jan. 29, 2013.

(51) Int. Cl.
| | |
|---|---|
| *G10L 21/00* | (2013.01) |
| *G10L 21/02* | (2013.01) |
| *G10L 15/08* | (2006.01) |
| *G10L 15/18* | (2013.01) |
| *G10L 15/26* | (2006.01) |
| G10L 21/003 | (2013.01) |
| G10L 21/057 | (2013.01) |
| G10L 25/60 | (2013.01) |
| H04M 3/56 | (2006.01) |

(52) U.S. Cl.
CPC ............. *G10L 15/08* (2013.01); *G10L 15/18* (2013.01); *G10L 15/26* (2013.01); *G10L 21/02* (2013.01); *G10L 21/003* (2013.01); *G10L 21/057* (2013.01); *G10L 25/60* (2013.01); *H04M 3/56* (2013.01)

(58) Field of Classification Search
CPC ...................................................... G01L 15/08
See application file for complete search history.

(56) References Cited

U.S. PATENT DOCUMENTS

| | | | |
|---|---|---|---|
| 6,721,704 B1 * | 4/2004 | Strubbe et al. | 704/270 |
| 7,571,210 B2 | 8/2009 | Swanson et al. | |
| 7,653,543 B1 * | 1/2010 | Blair et al. | 704/270 |

(Continued)

OTHER PUBLICATIONS

PCT International Search Report and Written Opinion, dated Apr. 22, 2014, for counterpart PCT Application PCT/US2013/064762.

*Primary Examiner* — Brian Albertalli
(74) *Attorney, Agent, or Firm* — Jeff Tang; Ryan, Mason & Lewis, LLP (57) ABSTRACT

Systems and methods for improving communication over a network are provided. A system for improving communication over a network, comprises a detection module capable of detecting data indicating a problem with a communication between at least two participants communicating via communication devices over the network, a management module capable of analyzing the data to determine whether a participant is dissatisfied with the communication, wherein the management module includes a determining module capable of determining that the participant is dissatisfied, and identifying an event causing the dissatisfaction, and a resolution module capable of providing a solution for eliminating the problem.

15 Claims, 6 Drawing Sheets

(56) References Cited

U.S. PATENT DOCUMENTS

| | | | |
|---|---|---|---|
| 8,160,210 B2 * | 4/2012 | Hause et al. ................... 379/38 |
| 8,843,373 B1 * | 9/2014 | Allen et al. ................... 704/270 |
| 2002/0032561 A1 * | 3/2002 | Ishikawa ............ G10L 15/1822 704/3 |
| 2003/0081739 A1 * | 5/2003 | Hikishima ................. 379/88.01 |
| 2003/0177222 A1 | 9/2003 | Bradley et al. |
| 2004/0153320 A1 * | 8/2004 | Nahkla et al. ................. 704/246 |
| 2006/0122840 A1 * | 6/2006 | Anderson et al. ............ 704/275 |
| 2006/0215824 A1 * | 9/2006 | Mitby et al. ............ 379/100.05 |
| 2006/0233347 A1 * | 10/2006 | Tong et al. ............... 379/265.06 |
| 2007/0067159 A1 * | 3/2007 | Basu et al. ................... 704/200 |
| 2007/0071206 A1 | 3/2007 | Gainsboro et al. |
| 2007/0286347 A1 | 12/2007 | Moore |
| 2007/0286351 A1 | 12/2007 | Eithier et al. |
| 2009/0086933 A1 * | 4/2009 | Patel et al. ...................... 379/52 |
| 2009/0231438 A1 | 9/2009 | Srivastava et al. |
| 2009/0234655 A1 * | 9/2009 | Kwon ....................... 704/270.1 |
| 2009/0265175 A1 * | 10/2009 | Fang ..................... G06F 17/289 704/277 |
| 2010/0131264 A1 * | 5/2010 | Ljolje et al. ...................... 704/9 |
| 2010/0250249 A1 * | 9/2010 | Fujino .......................... 704/235 |
| 2011/0149013 A1 | 6/2011 | Khot et al. |
| 2011/0282669 A1 * | 11/2011 | Michaelis .................... 704/270 |
| 2013/0144616 A1 * | 6/2013 | Bangalore ................... 704/226 |
| 2014/0180695 A1 * | 6/2014 | Beckman et al. ............ 704/258 |

\* cited by examiner

- RECEIVER OF CLASSES OF EVENTS — 400
- STATISTICAL FILTER — 401
- OUTPUT — 402

- DATABASE OF SOLUTIONS — 500
- MATCHING MODULE — 501
- RETURN MODULE — 502

| PROBLEM | SOLUTION |
|---|---|
| USER IS HESITANT AND AUDIO ON OTHER END IS BASE | INFORM ANOTHER END CALLER |
| USER DOES NOT UNDERSTAND FOREIGN LANGUAGE | ACTIVATE MACHINE TRANSLATION |
| USER HAS STRONG ACCENT | USER ACCENT REAL TIME TRANSFORMATION SYSTEM |
| USER HAS DIFFICULTY PROCESSING FAST SPEECH | SLOW DOWN SPEECH ON USER END (INSERT PAUSES) |

IMPROVING VOICE COMMUNICATION OVER A NETWORK

CROSS-REFERENCE TO RELATED APPLICATION

This application is a Continuation of U.S. application Ser. No. 13/752,503, filed on Jan. 29, 2013, the disclosure of which is incorporated herein in its entirety by reference.

TECHNICAL FIELD

The field generally relates to systems and methods for improving communication and, in particular, to systems and methods for improving voice communication over a network.

BACKGROUND

Voice communications, such as conference calls over a network, wherein the participants are located in multiple geographic areas (referred to as "multi-geo" communications), may be difficult for the participants due to factors, such as a lack of familiarity with voices, customs, names and accents, as well as low audio quality due to, for example, poor or intermittent connections and/or problems with equipment. As a result, it may be difficult for one or more participants to identify and understand attendees during these communications. Additionally, people who participate in a call may often hesitate to inform the other participants about their inability to understand the other callers, due to for example, embarrassment, or fear of offending the other participants.

Accordingly, there is a need to detect situations when participants in a voice communication do not comprehend what is being spoken and to provide solutions to improve comprehension and the overall quality of voice communications, such as conference calls.

SUMMARY

In general, exemplary embodiments of the invention include systems and methods for improving communication and, in particular, to systems and methods for improving voice communication over a network.

According to an exemplary embodiment of the present invention, a system for improving communication over a network comprises a detection module capable of detecting data indicating a problem with a communication between at least two participants communicating via communication devices over the network, a management module capable of analyzing the data to determine whether a participant is dissatisfied with the communication, wherein the management module includes a determining module capable of determining that the participant is dissatisfied, and identifying an event causing the dissatisfaction, and a resolution module capable of providing a solution for eliminating the problem.

The resolution module may comprise a matching module capable of finding a solution from a database that corresponds to the event causing the dissatisfaction.

The data can comprise at least part of a dialogue between the at least two participants, the part of the dialogue including at least one of a keyword or a key phrase recognized as an indicator of the problem, biometric data, location information of the participants, and/or at least one speech pattern of a participant.

The system can comprise at least one biometric sensor respectively connected with each of the communication devices for capturing the biometric data.

The management module can comprise a natural language processor, an automatic speech recognition module, and/or a classification module capable of classifying the data into events causing the dissatisfaction.

The system may further comprise a speech to text module capable of converting speech from a first participant into text prior to reception of the speech by a second participant, wherein the text is displayed on a communication device of the second participant.

The resolution module can be capable of at least one of filtering speech impediments, changing an accent, and changing a rate of speech from a first participant prior to reception of the speech by a second participant.

According to an exemplary embodiment of the present invention, a method for improving communication over a network comprises monitoring the communication between participants over the network to detect data indicating a problem with the communication, analyzing the data to determine whether a participant is dissatisfied with the communication, and if it is determined that the participant is dissatisfied, identifying an event causing the dissatisfaction, and providing a solution for eliminating the problem, wherein one or more steps of the method are performed by a computer system comprising a memory and at least one processor coupled to the memory.

The data can comprise at least part of a dialogue between participants, the part of the dialogue including at least one of a keyword or a key phrase recognized as an indicator of the problem, biometric data, such as, for example, movement by, body temperature of and a facial expression of a participant, location information of the participants, and/or at least one speech pattern of a participant.

Analyzing may comprise natural language processing and/or automatic speech recognition.

The method may further comprise processing the data to classify the data into events causing the dissatisfaction, filtering the events and determining that the participant is dissatisfied from the filtered events.

Providing the solution may comprise modifying speech from a first participant prior to reception of the speech by a second participant, wherein modifying comprises converting the speech into text to be displayed for the second participant, filtering speech impediments, changing an accent, changing a rate of the speech, and/or determining parts of the speech that were dropped, and integrating the dropped parts into synthesized speech.

According to an exemplary embodiment of the present invention, an article of manufacture comprises a computer readable storage medium comprising program code tangibly embodied thereon, which when executed by a computer, performs method steps for improving communication over a network, the method steps comprising monitoring the communication between participants over the network to detect data indicating a problem with the communication, analyzing the data to determine whether a participant is dissatisfied with the communication, and if it is determined that the participant is dissatisfied, identifying an event causing the dissatisfaction, and providing a solution for eliminating the problem.

According to an exemplary embodiment of the present invention, an apparatus for improving communication over a network, comprises a memory, and a processor coupled to the memory and configured to execute code stored in the memory for monitoring the communication between participants over the network to detect data indicating a problem with the communication, analyzing the data to determine whether a participant is dissatisfied with the communication, and if it is determined that the participant is dissatisfied, identifying an event causing the dissatisfaction, and providing a solution for eliminating the problem.

These and other exemplary embodiments of the invention will be described or become apparent from the following detailed description of exemplary embodiments, which is to be read in connection with the accompanying drawings.

BRIEF DESCRIPTION OF THE DRAWINGS

Exemplary embodiments of the present invention will be described below in more detail, with reference to the accompanying drawings, of which.

DETAILED DESCRIPTION OF EXEMPLARY EMBODIMENTS

Exemplary embodiments of the invention will now be discussed in further detail with regard to systems and methods for improving communication and, in particular, to systems and methods for improving voice communication over a network. This invention may, however, be embodied in many different forms and should not be construed as limited to the embodiments set forth herein.

According to embodiments of the present invention, the communications can be performed via communication devices such as, for example, desktop computers, laptops, mobile phones, such as smartphones, personal digital assistants (PDAs), or any other device capable of receiving and sending voice communications over a network. The network can include, but is not limited to, for example, a local area network (LAN), wide area network (WAN), cellular network, satellite network and the Internet. In the case of embodiments of the invention that are applied to communications between participants in multiple geographic areas, for example, in different parts of the world, the embodiments of the invention can be geo-enabled, wherein location and geographical information of participants are embedded and/or leveraged to detect issues with comprehension and provide solutions to improve understanding and the overall quality of voice communications.

Figure 1:
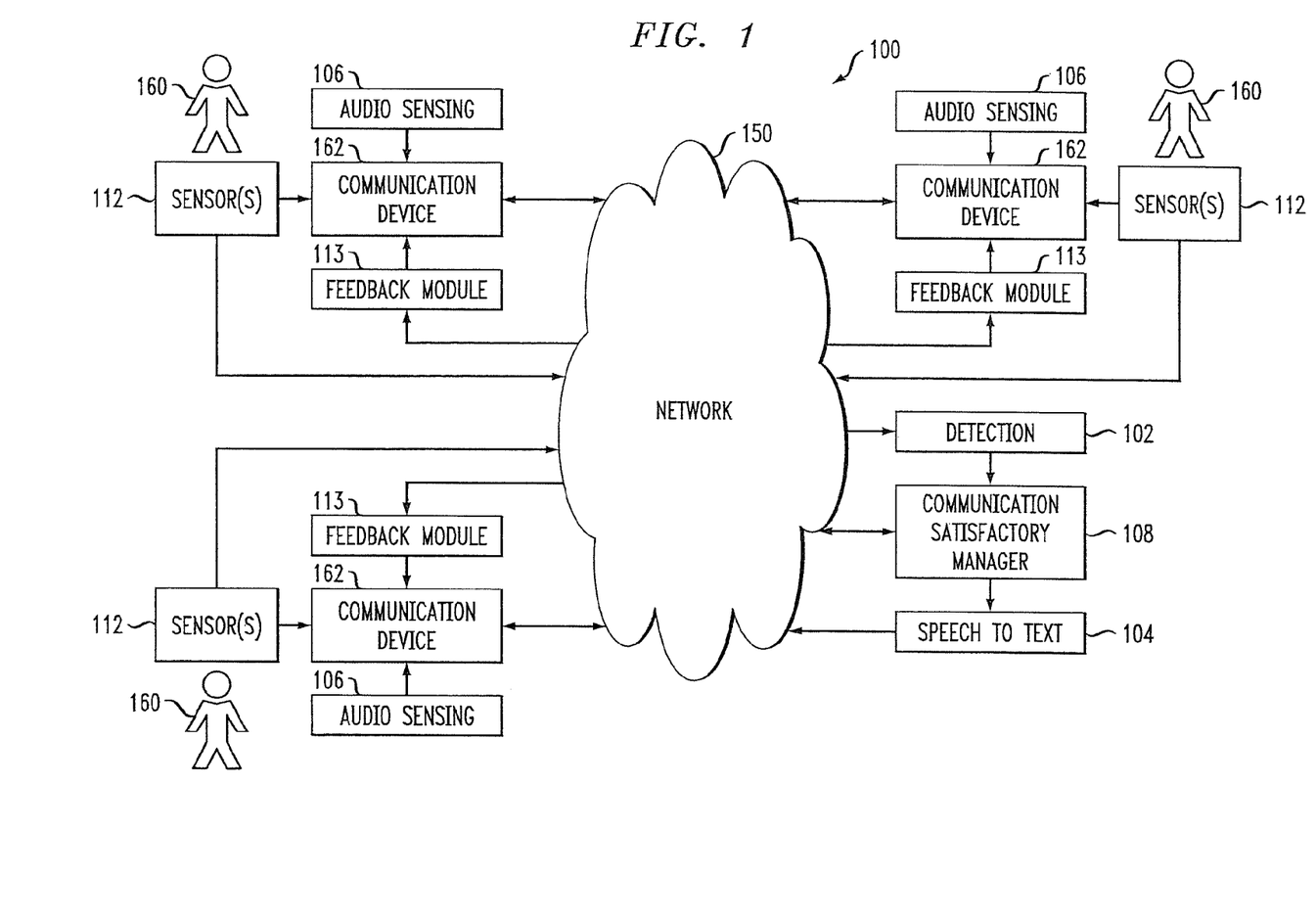
FIG. 1 is a high-level diagram of a system for improving voice communication over a network according to an exemplary embodiment of the invention.

Referring to FIG. 1, which shows a system 100 for improving voice communication over a network, a detection module 102 includes, for example, one or more bots, such as web robots, or other software applications that run automated tasks over a network 150, such as the Internet. The bots detect that there are meeting constituents from multiple geographic areas and/or detect difficulty understanding communicated speech. According to embodiments of the present invention, the detection module 102 can detect that meeting constituents 160 are from multiple geographic areas using for example, location information or signals provided from each communication device 162 via GPS, Wi-Fi or Wi-Fi type devices in the communication device 162, the Internet Protocol (IP) addresses of the communication devices, the telephone numbers of the communication devices, and/or phrases and/or keywords uttered by the participants 160 which may lead to a conclusion as to the location of the participant. The detection module 102 may detect difficulty understanding communicated speech by certain phrases and/or keywords uttered by the participants (e.g., "I'm sorry, I didn't catch your name", "pause, ok", "Can you repeat that?") or by other clues, which could be user configured, indicating that a communication participant was not understood. For example, a user could set a monitoring criterion to indicate a problem with understanding when the user fails to repeat another participant's name back when introductions are being made.

According to embodiments of the present invention, the detection module 102 is also capable of detecting one or more speech patterns of the participants, for example, a speech impediment, such as a stutter or using a repetitive word/phrase, an accent, or a rate of speech which could indicate cognitive or hearing impairment. The detection module 102 is also capable of detecting uttered words and phrases that have different meanings across geographic regions and/or cultures.

Figure 2:
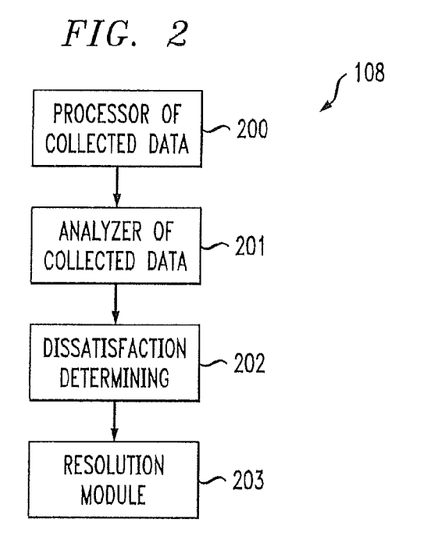
FIG. 2 is a high level diagram of the communication satisfactory manager module of FIG. 1, according to an exemplary embodiment of the invention.

Each of the detected issues are input from the detection module 102 to a communication satisfactory manager module 108, which processes the detected problems to develop solutions for each problem. Referring to FIG. 2, according to embodiments of the present invention, the output from the detection module 102 is sent to the communication satisfactory manager module 108, which includes a processor and analyzer of collected data 200 and 201. The processor of collected data 200 processes the location, phrase/keyword, speech impediment, speech rate and/or accent data from the detection module 102 so that it can be analyzed by the analyzer of collected data 201, which together with the dissatisfaction determining module 202, determines whether there are problems with the communication resulting in one or more participants not comprehending what is being said by one or more of the remaining participants. According to an embodiment, the analyzer of collected data 201 can compile the data from the detection module 102 and output information on the location, and the type and magnitude of detected issues for each participant. The dissatisfaction determining module 202 uses the output from the analyzer of collected data 201 to determine whether any participants are having problems understanding other participants. If it is determined that any of the participants are not comprehending the other participants, the resolution module 203 uses the outputs from the analyzer of collected data 201 and dissatisfaction determining module 202 to isolate the underlying cause of the problem, and come up with an appropriate solution based on the isolated cause. According to embodiments of the present invention, solutions may include, for example, automatic speech recognition (ASR), machine translation (MT), filtering speech impediments, speech to text transformation, transforming an accent into one that is agreeable to the listener if an accent is detected and does not appeal to the listener, and/or slowing down speech for a user by, for example, inserting pauses. In connection with the accent transformation, if there are multiple listeners, accents can be transformed in accordance with each user's preference.

According to an embodiment, the system 100 includes a speech/voice to text module 104 connected to the communication satisfactory manager module 108. If it is concluded that a participant 160 has difficulty in understanding during a meeting, the communication satisfactory manager module 108 may determine that a speech to text transformation solution be used, and send a signal to the speech/voice to text module 104, which creates a voice to text box translating the speech of the misunderstood participant to text, which is transmitted to those participant(s) 160 having the difficulty understanding. According to an embodiment, the voice to text box is displayed on a display, such as a screen, of the corresponding communication device 162.

According to embodiments of the present invention, sensors 112, for example, biometric sensors, are within, coupled to or electronically connected to each communication device 162 to communicate biometric measurements of the participants 160 to the communication satisfactory manager module 108 via the network 150. According to an embodiment, sensors 112 can also be directly connected to the network. The output from the sensors can be sent to the communication satisfactory manager module 108 via the network 150, or via the network 150 and the detection module 102.

Users may behave in a certain manner when they are not able to comprehend what is being said by another party, and this behavior can be quantitatively measured through different biometric measurements. Biometric measurements measure, for example, physiological and behavioral characteristics including, but not limited to, an individual's voice, movements, gestures, expressions, posture, etc. Embodiments of the present invention use biometric information to determine when a meeting participant 160 is not able to comprehend what is being said. For example, according to an embodiment, when a participant is having difficulty understanding another person, the communication satisfactory manager module 108 can use information such as movements in one's seat, pressure, temperature and humidity levels, for example, via a user's hands, facial expressions, gestures, etc., to detect participant dissatisfaction. According to embodiments of the present invention, dissatisfied or dissatisfaction can refer to a situation where a participant is not able to understand what is being said by other participants as a result of, for example, poor audio quality, connection problems, speech patterns or impairments of the listeners or speakers, and/or cultural or geographical differences.

Individuals tend to provide implicit physical feedbacks when they are not understanding something, and these feedbacks can be measured using biometric sensors. Such feedbacks include, but are not limited to rolling one's eyes, furrowing one's brow, curling one's lip, shrugging one's shoulders, throwing one's hands up in the air, etc.

According to embodiments of the present invention, the sensors 112 can measure and/or capture, for example, voice level, pulse rate, hand or body temperature, facial expressions (e.g., satisfied/dissatisfied) and body movements. Sensors 112 may include, but are not limited to, pressure, motion, pulse rate and/or temperature sensors, microphones and video and/or still image cameras.

Referring to FIGS. 1 and 2, the output from the sensors 112 is sent to the communication satisfactory manager module 108, which includes the processor and analyzer of collected data 200 and 201. The processor of collected data 200 processes the sensor data so that it can be analyzed by the analyzer of collected data 201, which together with the dissatisfaction determining module 202, determines whether there are problems with the communication resulting in one or more participants not comprehending what is being said by one or more of the remaining participants. According to an embodiment, the analyzer of collected data 201 can compile the sensor data and output information on the type and level of biometric activity for each participant. The dissatisfaction determining module 202 uses the output from the analyzer of collected data 201 to determine whether any participants are dissatisfied. If it is determined that any of the participants are dissatisfied, the resolution module 203 uses the outputs from the analyzer of collected data 201 and dissatisfaction determining module 202 to isolate the underlying cause of the problem, and come up with an appropriate solution based on the isolated cause. According to an embodiment of the present invention, the processor of collected data 200 processes the sensor data together with the location, phrase/keyword, speech impediment, speech rate and/or accent data from the detection module 102 so that the combined data can be analyzed by the analyzer of collected data 201, and the analyzer of collected data 201 compiles the sensor data together with the data from the detection module 102 and outputs information on the biometric activity, the location, and the type and magnitude of detected issues for each participant.

According to an embodiment, each communication device 162 includes an audio sensing module 106 capable of sensing audio received at a user end, and determining and/or estimating the quality of received audio. The audio sensing module 106 can include, for example, an audio sensor, such as a microphone, or some transducer coupled to a processor for processing the sensed audio; and outputting a quality determination.

If the audio sensing module 106 makes a determination that the audio quality is low, the embodiments of the invention provide for one or more solutions to increase the quality. The solutions include, but are not limited to: (1) automatically increasing a volume of audio received at a user end; (2) improving technical reception capability (e.g., expanding bandwidth, reducing channel noise, etc.); (3) sending a feedback to a person who spoke requesting that the person repeat his/her phrase if there are significant parts of audio that were not received on a user end (as sometimes happens if a conference system uses an Internet network), (4) if the audio quality problem persists, re-rounding telephone connection paths through different routes; (5) transcribing a user speech at the end where the user speaks to textual data, sending the textual data over a communication line and converting text to speech at a receiving end, (6) if the system determines parts of speech that were dropped, integrating the dropped parts into synthesized speech before playing the speech at the receiving end, (7) providing feedback on quality at a receiving end to a sender, so that the sender can adjust his/her speech to increase quality based on the feedback, (8) filtering the speech, for example, to remove stuttering before it is received by listeners and/or to slow the speech down by adding silence between words or extending sounds, and (9) highlighting words in text that has been transcribed to indicate a potential misunderstanding in real-time or replacing the text.

In connection with (6), according to an embodiment of the present invention, the algorithm for determining what parts are dropped can use a monitoring of packages that arrive to the receiver end at some port. This can cause some delay in getting speech to users, but this delay would be less then asking someone to repeat whole phrases. In connection with (7), a feedback module 113 at a receiver end and connected to the network 150 can include, for example, colored buttons with varying intensity to show the quality of the audio being received and/or the level of happiness/satisfaction of the listeners/receivers. According to an embodiment, the feedback module 113 can be integrated with or coupled to the communication device 162. According to an embodiment, the feedback module 113 can receive requests that the participant repeat a phrase because a person on the other line did not understand what the participant said. Specifically the feedback could include, but is not limited to, requests such as, "you have spoken too quickly please slow down", "you have mispronounced something, please correct", and/or "the channel was noisy, please repeat".

Figure 3:
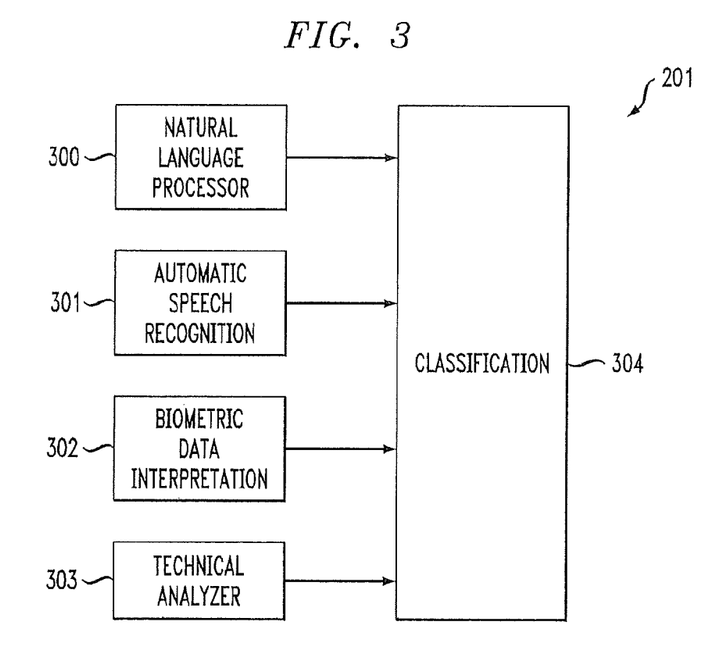
FIG. 3 is a high level diagram of the analyzer of collected data of FIG. 2, according to an exemplary embodiment of the present invention.

Referring to FIG. 3, according to an embodiment, the analyzer of collected data 201 includes a natural language processor 300, an automatic speech recognition module 301, a biometric data interpretation module 302, a technical analyzer module 303 and a classification module 304. The natural language processor 300 processes the phrases and/or keywords uttered by the participants 160 to derive meaning from the natural language input that may lead to a conclusion as to the location of a participant, the nature of the problem of the participant, and/or that one or more of the participants is having difficulty understanding other participants. The natural language processor 300 is connected to the classification module 304 to output the results of the natural language processing to the classification module 304, which compiles the natural language data together with the remaining data to classify the detected issues for each participant. The automatic speech recognition module 301 translates the phrases and/or keywords uttered by the participants 160 into text to derive meaning from these voice inputs that may lead to a conclusion as to the location of a participant, the nature of the problem of the participant, and/or that one or more of the participants is having difficulty understanding other participants. Like the natural language processor 300, the automatic speech recognition module 301 is connected to the classification module 304 to output the results of the automatic speech recognition to the classification module 304, which compiles the speech recognition data together with the remaining data to classify the detected issues for each participant.

The biometric data interpretation module 302 interprets the biometric data from the participants 160 (e.g., images, pressure, temperature, gestures, etc.) to derive meaning from these features and/or actions that may lead to a conclusion as to the location of a participant, the nature of the problem of the participant, and/or that one or more of the participants is having difficulty understanding other participants. Like the natural language processor 300 and the automatic speech recognition module 301, the biometric data interpretation module 302 is connected to the classification module 304 to output the results of the biometric data interpretation to the classification module 304, which compiles the biometric data interpretation data together with the remaining data to classify the detected issues for each participant.

The technical analyzer module 303 analyzes remaining technical data, such as, for example, location data, including GPS data, IP addresses, telephone numbers, user identified monitoring criteria, and equipment/device performance data to derive meaning from these features that may lead to a conclusion as to the location of a participant, the nature of the problem of the participant, and/or that one or more of the participants is having difficulty understanding other participants. Like the natural language processor 300, the automatic speech recognition module 301, and the biometric data interpretation module 302, the technical analyzer module 303 is connected to the classification module 304 to output the results of the technical data analysis to the classification module 504, which compiles the technical data analysis together with the remaining data to classify the detected issues for each participant.

Figure 4:
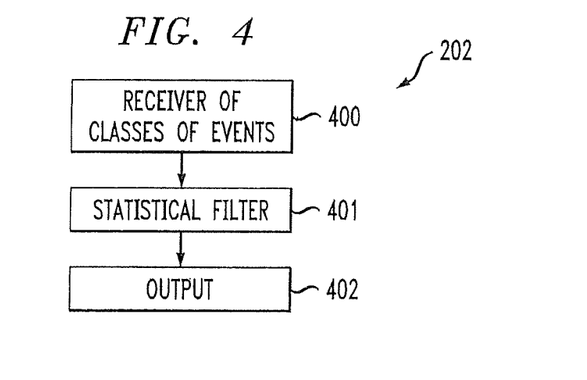
FIG. 4 is a high-level diagram of the dissatisfaction determining module of FIG. 2, according to an exemplary embodiment of the invention.

Referring to FIG. 4, the dissatisfaction determining module 202 includes a receiver 400 of the classes of events, which are received from the classification module 304, a statistical filter 401, and an output module 402 outputting the determination of whether any and which of the participants are dissatisfied. Based on one or more filter settings, including, for example, magnitude thresholds and/or settings requiring the removal of predetermined types of data, the statistical filter 401 filters the environment of detected events causing the dissatisfaction to output a narrowed environment of dissatisfaction events from which the dissatisfaction determining module 202 draws to determine those participants that are dissatisfied.

Figure 5:
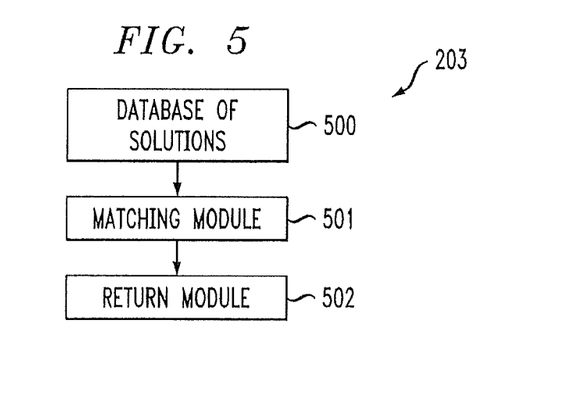
FIG. 5 is a high-level diagram of the resolution module of FIG. 2, according to an exemplary embodiment of the invention.
Figure 6:
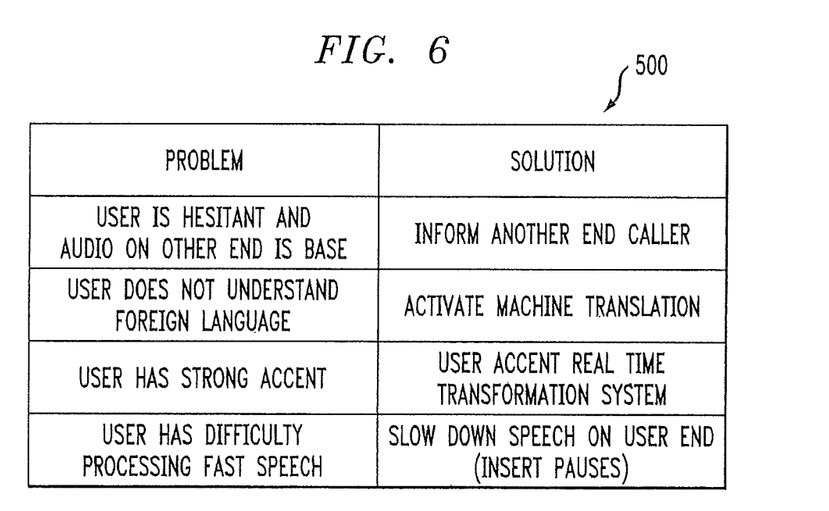
FIG. 6 illustrates the database of solutions of FIG. 5, according to an exemplary embodiment of the invention.

Referring to FIG. 5, the resolution module 203 comprises a database of solutions 500. As shown in FIG. 6, the database of solutions 500 includes a list of problems that can result in or indicate a lack of understanding of other participants in a voice communication. The database 500 further includes corresponding solutions to address the lack of comprehension for each problem. The list of problems shown in FIG. 6 is not exhaustive, and the database 500 can include additional problems and solutions. The resolution module 203 further includes a matching module 501, which uses the outputs from the analyzer of collected data 201 and the dissatisfaction determining module 202 to determine the currently occurring problem or problems. The matching module 501 queries and/or searches the database 500 for a solution that matches with the currently occurring problem, and sends the solution for implementation through the return module 502.

Figure 7:
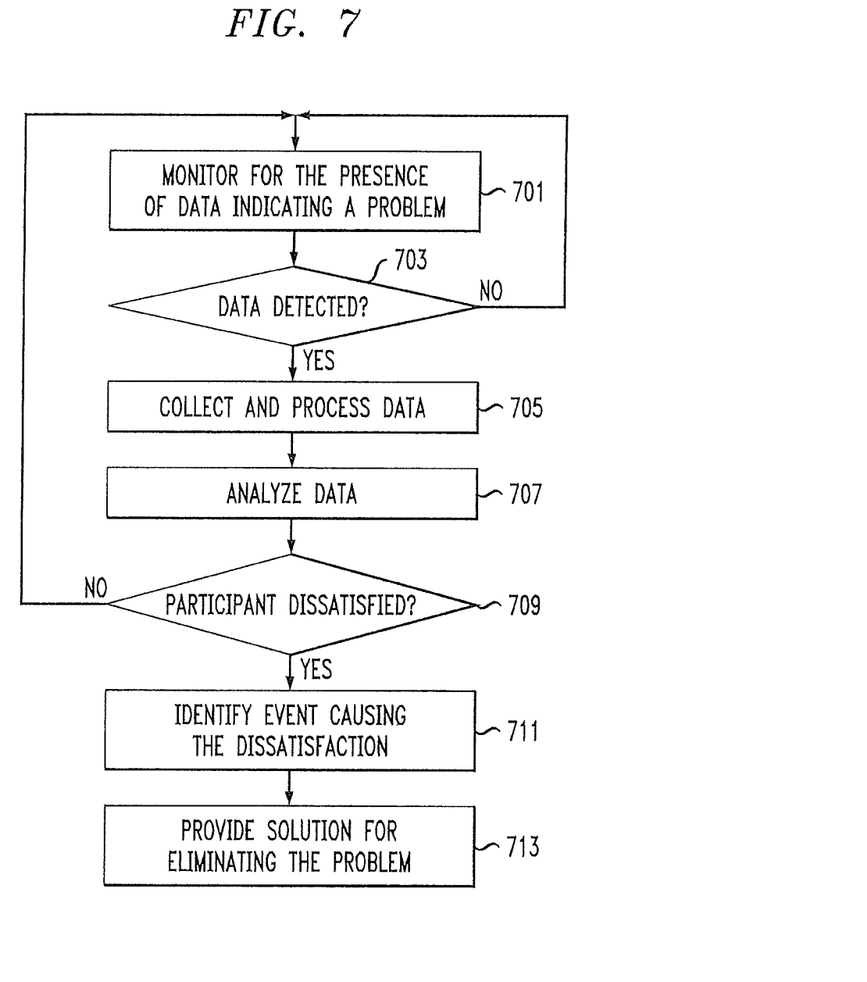
FIG. 7 is a flow diagram of a method for improving voice communication over a network according to an exemplary embodiment of the invention.

Referring to FIG. 7, in a method for improving communication over a network, a communication between participants over the network is monitored for the presence of data indicating a problem with the communication (block 701). According to embodiments of the present invention, the data can comprise parts of a dialogue between participants that include keywords and/or key phrases predetermined as indicating a problem with a communication (e.g., "I'm sorry, I didn't catch your name", "pause, ok", "Can you repeat that?"). The data may also comprise biometric data, such as movement by, body temperature of and a facial expression of a participant indicating dissatisfaction. According to embodiments of the present invention, the data can also comprise location information of the participants and/or speech patterns of a participant.

If no such data is detected at block 703, the method continues back to block 701 to monitor for the presence of such data. If such data is detected, the method continues to block 705 where the data is collected and processed, and proceeds to block 707, where the data is analyzed to determine whether a participant is dissatisfied with the communication. In accordance with embodiments of the present invention, analyzing can include interpreting the biometric data, natural language processing, automatic speech recognition and/or analysis of technical data.

If it is determined at block 709 that the participant is not dissatisfied, the method goes back to block 701 to monitor for the presence of data indicating a problem. If it is determined at block 709 that the participant is dissatisfied, the method proceeds to block 711, where an event causing the dissatisfaction is identified, and to block 713 where a solution for eliminating the problem is provided. The solution corresponds to the event causing the dissatisfaction and can be retrieved from a database of solutions. Providing the solution may require modifying speech from a first participant prior to reception of the speech by a second participant by converting the speech into text to be displayed for the second participant, filtering speech impediments, changing an accent, changing a rate of the speech and/or determining parts of the speech that were dropped, and integrating the dropped parts into synthesized speech.

Prior to identifying the event causing the dissatisfaction, the data can be processed to classify the data into events causing the dissatisfaction, and the events filtered by a statistical filter.

Figure 8:
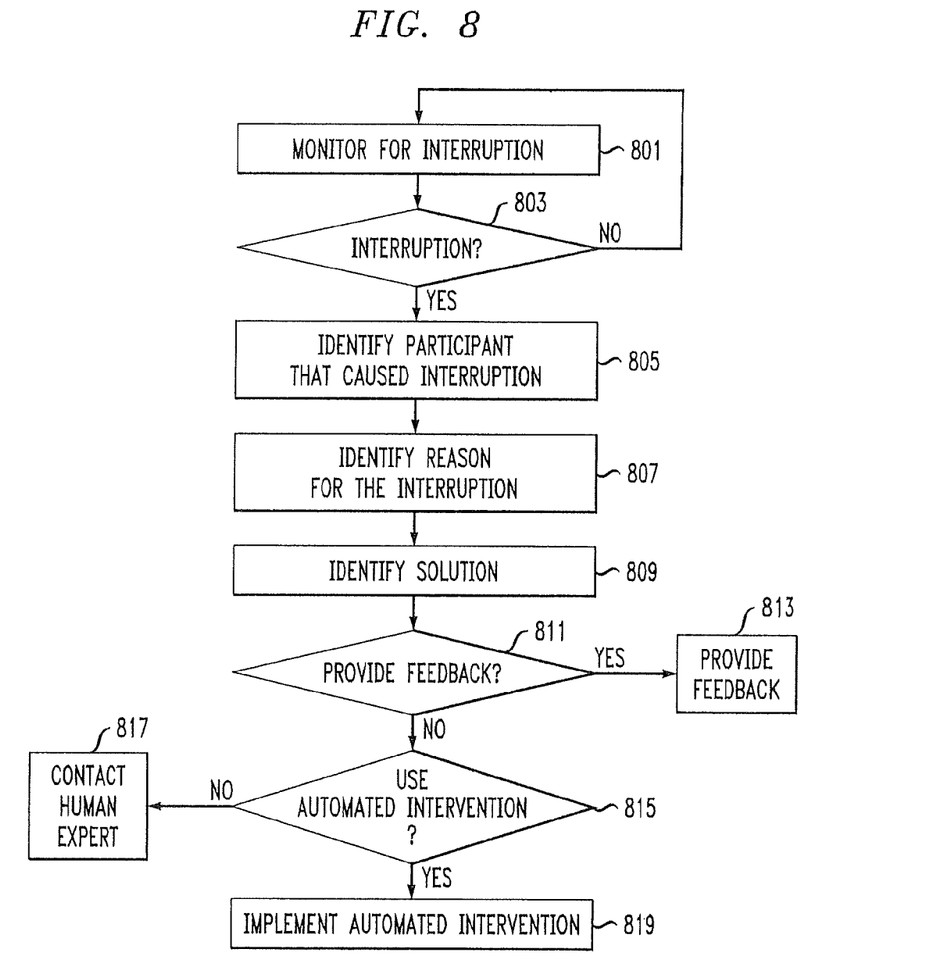
FIG. 8 is a flow diagram of a method for improving voice communication over a network according to an exemplary embodiment of the invention.

Referring to FIG. 8, in a method for improving communication over a network, it is queried at block 803 if there is an interruption (e.g., pausing, requests to repeat) in a communication such as telephone call. If no, the process proceeds to block 801 to monitor for the interruption. If yes, the process proceeds to block 805 where the participant (e.g., caller) that caused the interruption is identified. At block 807, a reason for the interruption is identified (e.g., poor audio quality, connection problems, speech patterns or impairments of the listeners or speakers, and/or cultural or geographical differences). Then at block 809, based on the reason for the interruption, a solution is identified. At block 811, it is determined whether there is a need to provide feedback. If yes, the process proceeds to block 813, where feedback is provided. According to an embodiment of the present invention, the participant who is speaking receives the feedback. The feedback can include a request that the participant repeat a phrase because a person on the other line did not understand what the participant said. Specifically the feedback could include, but is not limited to, requests such as, "you have spoken too quickly please slow down", "you have mispronounced something, please correct", and/or "the channel was noisy, please repeat".

If no at block 811, the process proceeds to block 815, where it is queried whether the solution is able to use automated intervention to modify the speech in a communication. If no at block 815, the process proceeds to block 817, where a human expert is contacted to attempt to fix the problem. If yes at block 815, the process proceeds to block 819, where automated intervention, such as, for example, automatic speech recognition, machine translation, filtering speech impediments, speech to text transformation, accent transformation, and/or slowing down speech, is implemented.

As will be appreciated by one skilled in the art, aspects of the present invention may be embodied as a system, apparatus, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIGS. 1-8 illustrate the architecture, functionality, and operation of possible implementations of systems, methods, and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Figure 9:
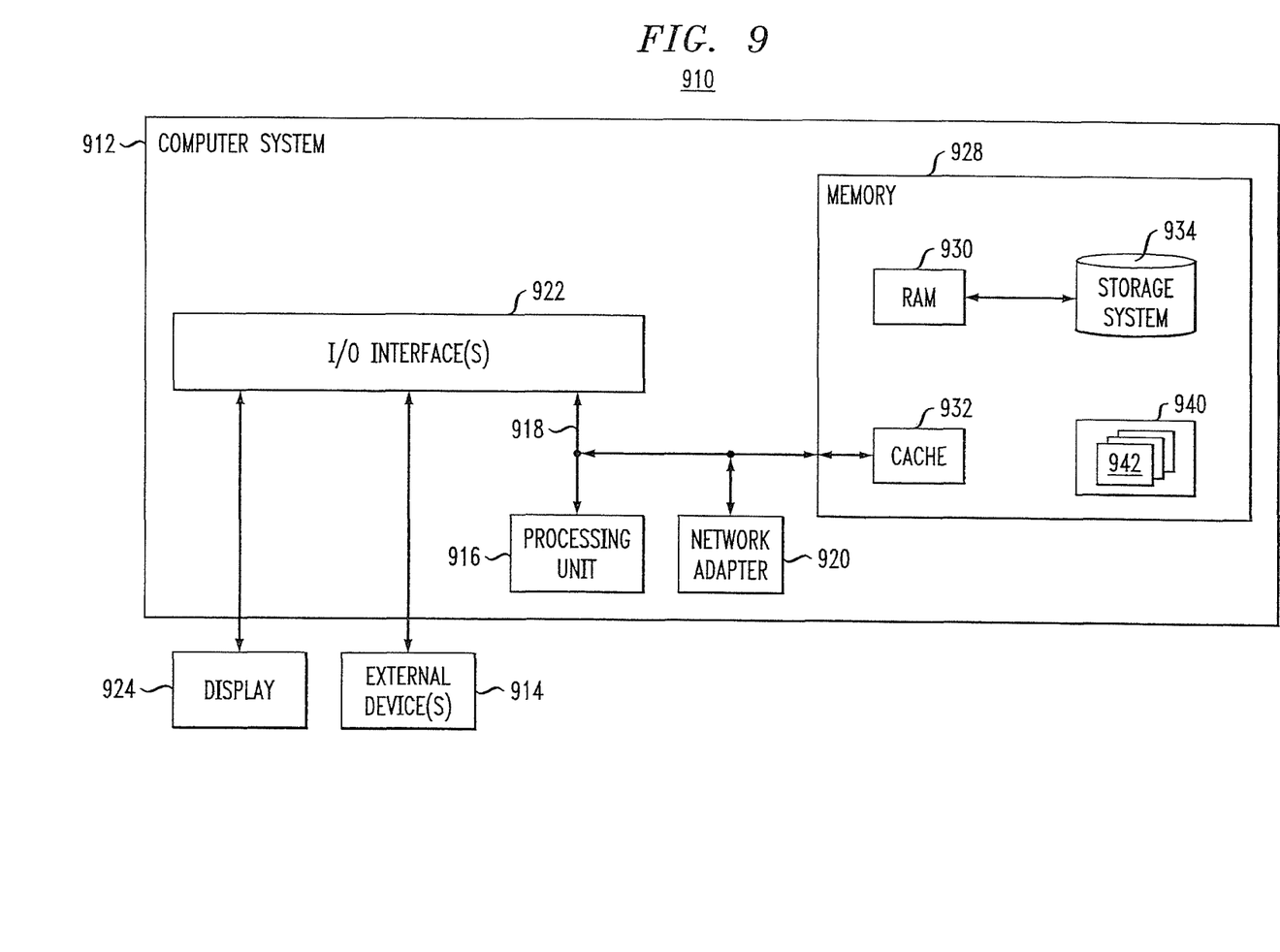
FIG. 9 illustrates a computer system in accordance with which one or more components/steps of the techniques of the invention may be implemented, according to an exemplary embodiment of the invention.

One or more embodiments can make use of software running on a general-purpose computer or workstation. With reference to FIG. 9, in a computing node 910 there is a computer system/server 912, which is operational with numerous other general purpose or special purpose computing system environments or configurations. Examples of well-known computing systems, environments, and/or configurations that may be suitable for use with computer system/server 912 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 912 may be described in the general context of computer system executable instructions, such as program modules, being executed by a computer system. Generally, program modules may include routines, programs, objects, components, logic, data structures, and so on that perform particular tasks or implement particular abstract data types. Computer system/server 912 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 912 in computing node 910 is shown in the form of a general-purpose computing device. The components of computer system/server 912 may include, but are not limited to, one or more processors or processing units 916, a system memory 928, and a bus 918 that couples various system components including system memory 928 to processor 916.

The bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 912 typically includes a variety of computer system readable media. Such media may be any available media that is accessible by computer system/server 912, and it includes both volatile and non-volatile media, removable and non-removable media.

The system memory 928 can include computer system readable media in the form of volatile memory, such as random access memory (RAM) 930 and/or cache memory 932. The computer system/server 912 may further include other removable/non-removable, volatile/nonvolatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 918 by one or more data media interfaces. As depicted and described herein, the memory 928 may include at least one program product having a set (e.g., at least one) of program modules that are configured to carry out the functions of embodiments of the invention. A program/utility 940, having a set (at least one) of program modules 942, may be stored in memory 928 by way of example, and not limitation, as well as an operating system, one or more application programs, other program modules, and program data. Each of the operating system, one or more application programs, other program modules, and program data or some combination thereof, may include an implementation of a networking environment. Program modules 942 generally carry out the functions and/or methodologies of embodiments of the invention as described herein.

Computer system/server 912 may also communicate with one or more external devices 914 such as a keyboard, a pointing device, a display 924, etc., one or more devices that enable a user to interact with computer system/server 912, and/or any devices (e.g., network card, modem, etc.) that enable computer system/server 912 to communicate with one or more other computing devices. Such communication can occur via Input/Output (I/O) interfaces 922. Still yet, computer system/server 912 can communicate with one or more networks such as a local area network (LAN), a general wide area network (WAN), and/or a public network (e.g., the Internet) via network adapter 920. As depicted, network adapter 920 communicates with the other components of computer system/server 912 via bus 918. It should be understood that although not shown, other hardware and/or software components could be used in conjunction with computer system/server 912. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:

1. A system for improving communication over a network, comprising:
   a memory and at least one processor coupled to the memory;
   a detection module executed via the at least one processor and capable of detecting data indicating a problem with a communication between at least two participants communicating via communication devices over the network;
   a management module executed via the at least one processor and capable of analyzing the data to determine whether a first participant is dissatisfied with the communication, wherein the communication is a voice communication and the dissatisfaction is based on the first participant failing to understand at least a portion of the voice communication, and wherein the management module includes:
      a determining module executed via the at least one processor and capable of determining that the first participant is dissatisfied, and identifying an event causing the dissatisfaction, and
      a resolution module executed via the at least one processor and capable of providing a solution for eliminating the problem, wherein providing the solution comprises performing an automatic operation on speech to be transmitted to the first participant from a second participant;
   wherein the data comprises at least one of location information of the participants and biometric data.

2. The system of claim 1, wherein the resolution module comprises a matching module capable of finding a solution from a database that corresponds to the event causing the dissatisfaction.

3. The system of claim 1, wherein the data comprises at least part of a dialogue between the at least two participants, the part of the dialogue including at least one of a keyword or a key phrase recognized as an indicator of the problem.

4. The system of claim 1, wherein the system comprises at least one biometric sensor respectively connected with each of the communication devices for capturing the biometric data.

5. The system of claim 1, wherein the data comprises at least one speech pattern of a participant.

6. The system of claim 1, wherein the management module comprises at least one of a natural language processor and an automatic speech recognition module.

7. The system of claim 1, wherein the management module comprises a classification module capable of classifying the data into events causing the dissatisfaction.

8. The system of claim 1, further comprising a speech to text module capable of converting the speech from the second participant into text prior to reception of the speech by the first participant, wherein the text is displayed on a communication device of the first participant.

9. The system of claim 1, wherein the location information is determined based on information from the communication devices of the at least two participants.

10. The system of claim 1, wherein the location information is derived by detecting at least one of a keyword or a key phrase having different meanings across at least one of geographic regions or cultures.

11. The system of claim 1, wherein the resolution module is capable of filtering a speech impediment from the second participant prior to reception of the speech by the first participant.

12. The system of claim 1, wherein the resolution module is capable of providing a machine translation of the misunderstood portion of the voice communication.

13. A system for improving communication over a network, comprising:
   a memory and at least one processor coupled to the memory;
   a detection module executed via the at least one processor and capable of detecting data indicating a problem with a communication between at least two participants communicating via communication devices over the network;
   a management module executed via the at least one processor and capable of analyzing the data to determine whether a first participant is dissatisfied with the communication, wherein the communication is a voice communication and the dissatisfaction is based on the first participant failing to understand at least a portion of the voice communication, and wherein the management module includes:
      a determining module executed via the at least one processor and capable of determining that the first participant is dissatisfied, and identifying an event causing the dissatisfaction, and
      a resolution module executed via the at least one processor and capable of providing a solution for eliminating the problem, wherein providing the solution comprises performing an automatic operation on speech to be transmitted to the first participant from a second participant;
   wherein the resolution module is capable of at least one of filtering one or more speech impediments, changing an accent, and changing a rate of the speech from the second participant prior to reception of the speech by the first participant.

14. An article of manufacture comprising a non-transitory computer readable storage medium comprising program code tangibly embodied thereon, which when executed by a computer, performs method steps for improving communication over a network, the method steps comprising:
   monitoring the communication between participants over the network to detect data indicating a problem with the communication;
   analyzing the data to determine whether a first participant is dissatisfied with the communication, wherein the communication is a voice communication and the dissatisfaction is based on the first participant failing to understand at least a portion of the voice communication; and
   if it is determined that the first participant is dissatisfied, identifying an event causing the dissatisfaction, and providing a solution for eliminating the problem, wherein providing the solution comprises performing an automatic operation on speech to be transmitted to the first participant from a second participant;
   wherein the data comprises at least one of location information of the participants and biometric data.

15. An apparatus for improving communication over a network, comprising:

a memory; and a processor coupled to the memory and configured to execute code stored in the memory for:
- monitoring the communication between participants over the network to detect data indicating a problem with the communication;
- analyzing the data to determine whether a first participant is dissatisfied with the communication, wherein the communication is a voice communication and the dissatisfaction is based on the first participant failing to understand at least a portion of the voice communication; and
- if it is determined that the first participant is dissatisfied, identifying an event causing the dissatisfaction, and providing a solution for eliminating the problem, wherein providing the solution comprises performing an automatic operation on speech to be transmitted to the first participant from a second participant;

wherein the automatic operation comprises modifying the speech from the second participant prior to reception of the speech by the first participant; and wherein modifying comprises at least one of filtering one or more speech impediments, changing an accent, and changing a rate of the speech.

\* \* \* \* \*